(12) United States Patent
Hwang et al.

(10) Patent No.: US 10,192,199 B2
(45) Date of Patent: Jan. 29, 2019

(54) ENABLING SERVICE FEATURES WITHIN PRODUCTIVITY APPLICATIONS

(75) Inventors: Jennifer Hui-ni Hwang, Bellevue, WA (US); Matthew Eckstein, Seattle, WA (US); Sam Franklin Williams, III, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1052 days.

(21) Appl. No.: 13/297,287

(22) Filed: Nov. 16, 2011

(65) Prior Publication Data

US 2013/0125011 A1 May 16, 2013

(51) Int. Cl.
*G06F 3/00* (2006.01)
*G06Q 10/10* (2012.01)

(52) U.S. Cl.
CPC .................................. *G06Q 10/10* (2013.01)

(58) Field of Classification Search
CPC ................................ G06F 21/10; G06F 21/45
USPC ........................................ 715/741, 744, 745
See application file for complete search history.

(56) References Cited

U.S. PATENT DOCUMENTS

| | | | |
|---|---|---|---|
| 6,633,907 B1 | 10/2003 | Spencer et al. | |
| 7,406,664 B1 * | 7/2008 | Morton | G06F 9/451 715/809 |
| 7,584,353 B2 * | 9/2009 | Risan | G06F 21/10 713/164 |
| 7,673,016 B2 * | 3/2010 | Kitada | G06F 17/3089 709/201 |
| 8,086,667 B1 * | 12/2011 | Randall | H04L 63/10 709/203 |
| 8,296,784 B1 * | 10/2012 | Brown | G06F 9/541 705/319 |
| 8,365,083 B2 * | 1/2013 | Martin | G06F 17/30873 715/765 |
| 8,707,184 B2 * | 4/2014 | Chen | G06Q 10/10 715/733 |
| 8,826,135 B1 * | 9/2014 | Durham | G06F 3/0484 715/716 |
| 2002/0065849 A1 * | 5/2002 | Ferguson | H04L 29/06 715/205 |
| 2002/0184402 A1 * | 12/2002 | Gangopadhyay | G06F 9/451 719/315 |

(Continued)

FOREIGN PATENT DOCUMENTS

| | | |
|---|---|---|
| CN | 102024193 A | 4/2011 |
| JP | 2007287131 A | 11/2007 |

(Continued)

OTHER PUBLICATIONS

"International Search Report", dated Mar. 26, 2013, Application No. PCT/US2012/065703, Filed date: Nov. 16, 2012, pp. 9.

(Continued)

*Primary Examiner* — Daeho D Song

(57) ABSTRACT

Systems, methods, and software are described herein for enhancing features within program applications. In an implementation, a user associated with a productivity application is identified and a service application associated with the user is identified. A service feature that corresponds to the service is enabled within the productivity application. The service feature allows the user to perform a function on content generated with the productivity application that is related to the service.

20 Claims, 7 Drawing Sheets

(56) References Cited

U.S. PATENT DOCUMENTS

| | | |
|---|---|---|
| 2005/0125389 A1 | 6/2005 | Hazzard et al. |
| 2006/0031770 A1* | 2/2006 | McMenamin ...... G06F 17/3002 715/741 |
| 2006/0085731 A1 | 4/2006 | Cui et al. |
| 2006/0248206 A1* | 11/2006 | Moerdijk ................ H04L 29/06 709/230 |
| 2006/0294042 A1 | 12/2006 | Kapadia et al. |
| 2007/0225962 A1* | 9/2007 | Brunet ................ G06F 11/1451 703/23 |
| 2008/0275939 A1* | 11/2008 | Martin ...................... G06F 8/61 709/203 |
| 2009/0222899 A1 | 9/2009 | Walters |
| 2009/0259731 A1 | 10/2009 | Luk et al. |
| 2010/0125612 A1 | 5/2010 | Amradkar et al. |
| 2010/0331064 A1* | 12/2010 | Michelstein ........... G06Q 10/10 463/1 |
| 2011/0099464 A1 | 4/2011 | Marashi et al. |
| 2011/0099616 A1* | 4/2011 | Mazur ................ H04L 63/0846 726/7 |
| 2011/0138047 A1 | 6/2011 | Brown et al. |
| 2011/0184827 A1 | 7/2011 | Hubert |
| 2012/0066286 A1* | 3/2012 | Heredia ................ G06Q 10/10 709/201 |
| 2012/0077546 A1* | 3/2012 | Kawa ...................... H04W 4/50 455/566 |
| 2012/0109836 A1* | 5/2012 | Chen ...................... H04W 4/21 705/319 |
| 2012/0227087 A1* | 9/2012 | Brown ................... G06Q 50/01 726/3 |
| 2012/0260329 A1* | 10/2012 | Suffling ................ H04L 63/104 726/9 |

FOREIGN PATENT DOCUMENTS

| | | |
|---|---|---|
| JP | 2010532027 A | 9/2010 |
| JP | 2011096251 A | 5/2011 |
| JP | 2013507882 A | 3/2013 |
| JP | 2013519171 A | 5/2013 |
| JP | 2013519945 A | 5/2013 |
| KR | 20100022980 A | 3/2010 |
| KR | 1020110123513 A | 11/2011 |
| RU | 2304804 C2 | 8/2007 |
| RU | 2491635 C2 | 8/2013 |

OTHER PUBLICATIONS

"VMware® Horizon App Manager", Retrieved at <<http://www.vmware.com/files/pdf/VMware-Horizon-App-Manager-Datasheet.pdf>>, Retrieved Date: Aug. 26, 2011, pp. 4.

"Viewing Metadata Using the Service Explorer", Retrieved at <<http://download.oracle.com/docs/cd/E13167_01/aldsp/docs30/admin/srvcbrowser.html>>, Retrieved Date: Aug. 29, 2011, pp. 16.

"Cloud Computing Overlay for Unified Service Delivery: Delivering Infrastructure-as-a-Service", Retrieved at <<http://www.cisco.com/en/US/solutions/collateral/ns341/ns525/ns951/solution_overview_c22-539404.html>>, Retrieved Date: Aug. 26, 2011, pp. 6.

"Office Action Issued in Chinese Patent Application No. 201210460997.X", dated Mar. 30, 2015, 12 Pages.

"Supplementary Search Report Issued in European Patent Application No. 12850654.0", dated Jun. 10, 2015, 5 Pages.

"Second Office Action and Search Report Issued in Chinese Patent Application No. 201210460997.X", dated Nov. 27, 2015, 12 Pages.

"Third Office Action Issued in Chinese Patent Application No. 201210460997.X", dated Jun. 13, 2016, 6 Pages.

"Office Action Issued in Japanese Patent Application No. 2014-542529", dated Dec. 6, 2016, 9 Pages.

"Office Action Issued in Australian Patent Application No. 2012340172", dated Apr. 26, 2017, 4 Pages.

"Notice of Allowance Issued in Russian Patent Application No. 2014119692", dated Apr. 10, 2017, 10 Pages. (w/o Translation).

"Office Action Issued in Russian Patent Application No. 2014119692", dated Sep. 26, 2016, 7 Pages.

"Office Action Issued in European Patent Application No. 12850654.0", dated Jun. 13, 2018, 8 Pages.

"Office Action Issued in Korean Patent Application No. 10-2014-7013109", dated Sep. 6, 2018, 8 Pages.

"Office Action Issued in Canadian Patent Application No. 2,855,838", dated Jul. 26, 2018, 4 Pages.

* cited by examiner

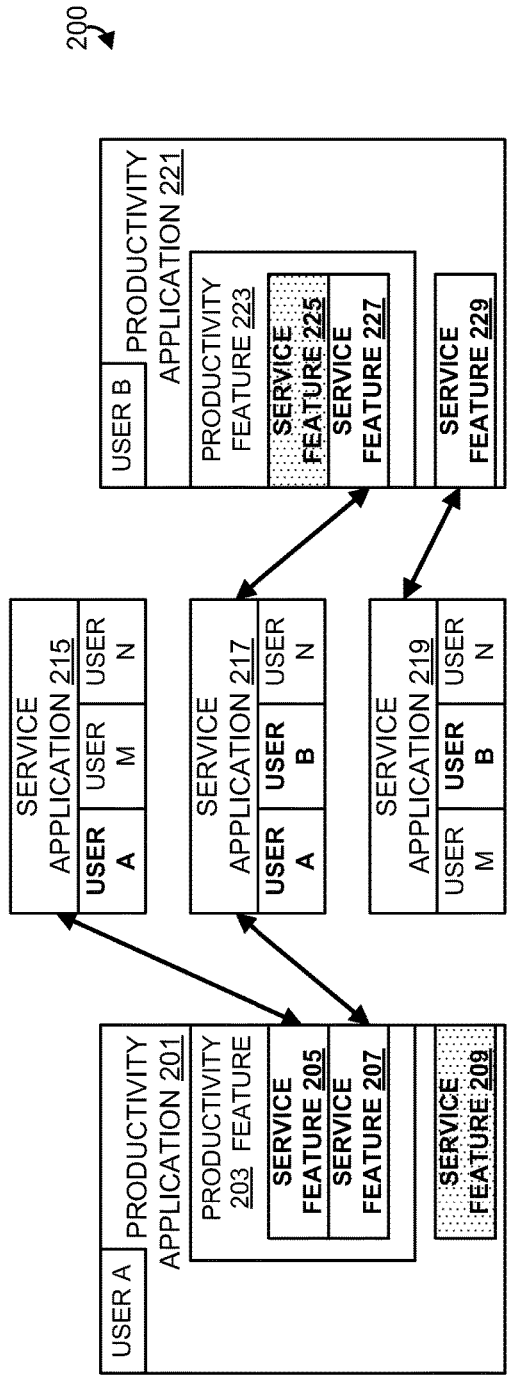
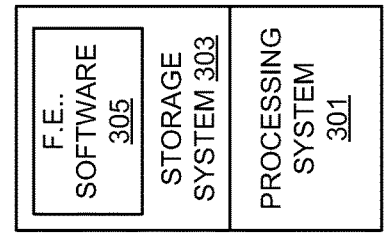
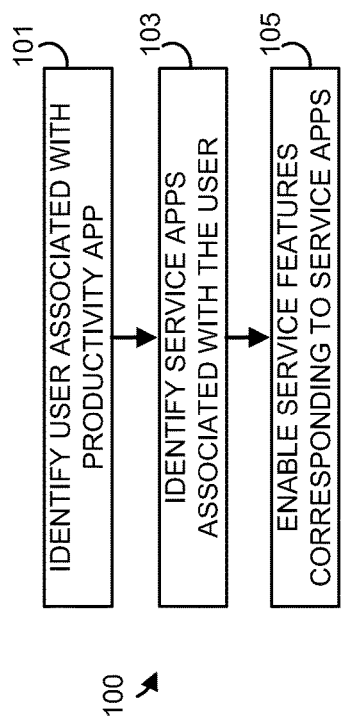
FIGURE 2
FIGURE 3
FIGURE 1

ENABLING SERVICE FEATURES WITHIN PRODUCTIVITY APPLICATIONS

TECHNICAL FIELD

Aspects of the disclosure are related to computer software applications, and in particular, to the enhanced integration of productivity applications with online services.

TECHNICAL BACKGROUND

In the field of computer hardware and software, a productivity application is generally understood to be a software program or application used to produce content and perform functions with respect to the content. Common examples of productivity applications include office productivity suites, accounting software, graphics applications, and other well-known programs, while common examples of content include word processing documents, spreadsheets, databases, and photos.

Many productivity applications provide feature menus that allow users to invoke functions. Two types of features are productivity features and service features. In general, productivity features are those features that allow the user to perform functions on content, such as printing, saving, or sharing the content. Service features can be understood as specific types of productivity features that correspond to online services. In an illustrative example, the send or share feature found in some document editors that allows the user to send a document to a destination can be considered a productivity feature. The specific destinations elaborated on within the send feature, such as a particular online collaboration service, may be considered a service feature.

Users are becoming increasingly engaged with online services, while at the same time, the variety and usefulness of online services continues to grow. Accordingly, the variety of service features found in productivity applications is likely to expand.

OVERVIEW

Provided herein are systems, devices, methods, and software that improve the integration of productivity applications with services by dynamically enabling service features corresponding to services with which a user may be involved. In some implementations, this may be done by identifying services associated with a user and enabling in the productivity applications the service features corresponding to the associated services. In this manner, the user experience with productivity applications is enhanced.

In other implementations, a user interface is provided that presents a productivity feature menu in the productivity application that corresponds to productivity features. Responsive to a selection from the productivity feature menu that corresponds to one of the productivity features, a service feature menu is presented that includes several service features. At least one of the service features may be enabled based on an association between the user and an online service corresponding to the service feature.

This overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates a process in an implementation.

FIG. 2 illustrates an enhanced feature environment in an implementation.

FIG. 3 illustrates a feature enablement system in an implementation.

TECHNICAL DISCLOSURE

Figure 4:
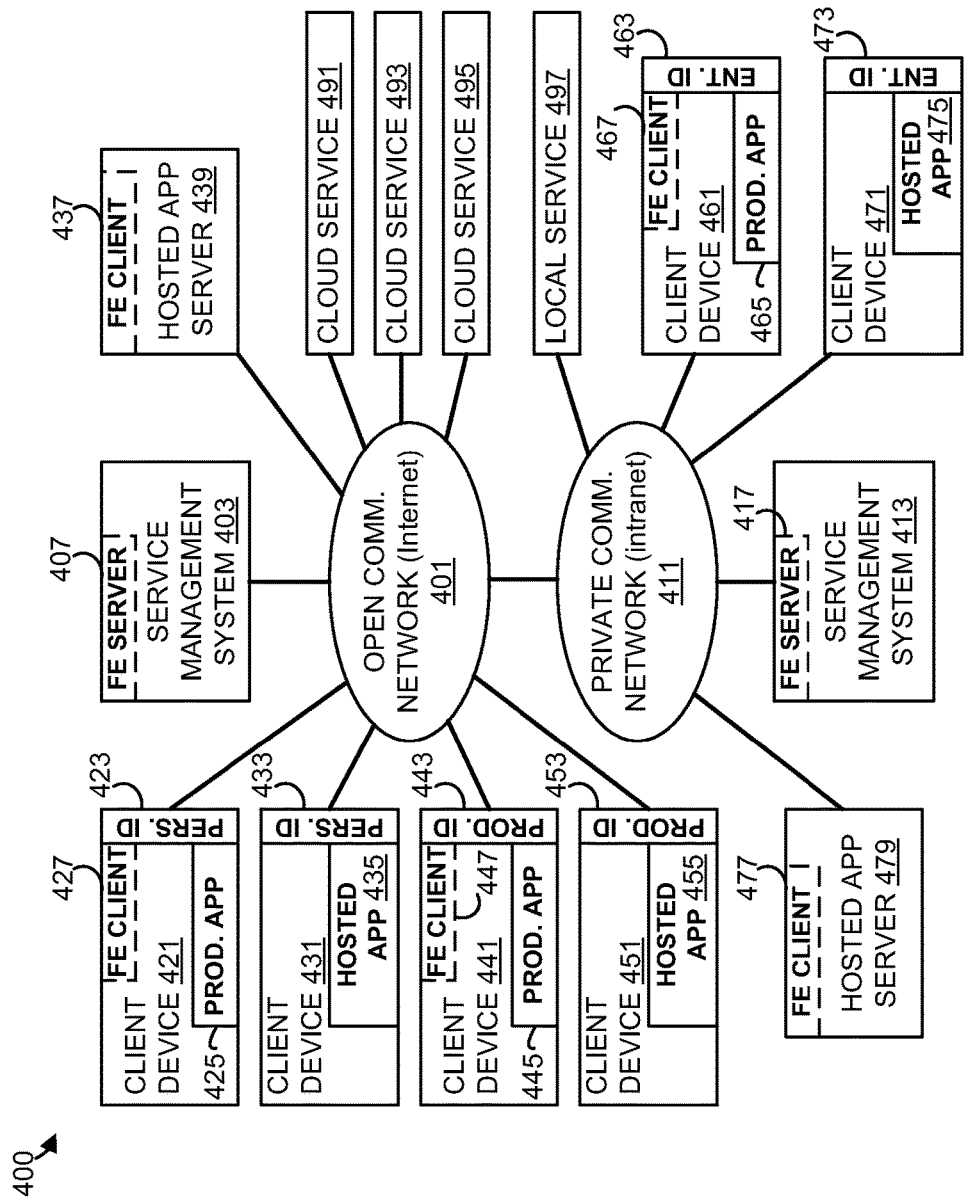
FIG. 4 illustrates an enhanced feature environment in an implementation.

Implementations described herein allow users to experience enhanced feature offerings in productivity applications based on with which online or other services the user may be associated. In particular, service features are dynamically enabled depending on the identity of the user engaged with a productivity application so that service features relevant to the user are enabled. The user can then invoke those service features to perform various functions or operations on the content they have generated working with the productivity application. In view of the wide variety of services with which users may be associated, by dynamically enabling and disabling service features on a per-user basis the user experience will remain uncluttered and easy to use.

In one non-limiting example, a user may be associated with a social networking website. When working on a document in a document editing program, service features within a menu in the program will be enabled that are associated with the social networking example. In contrast, service features associated with other social networks or services that are irrelevant to the user would be disabled, and perhaps not displayed at all.

FIG. 1 illustrates a process 100 for dynamically enabling service features. The following discussion of FIG. 1 is made with reference to FIG. 2 in order to demonstrate the association of users with service applications, and thus how corresponding service features within productivity applications 201 and 221 are dynamically enabled based on this association. FIG. 3 is intended to provide a brief, general description of a suitable computing system in which process 100 may be implemented.

Referring now to FIG. 1, beginning at step 101 a user associated with a productivity application is identified. In FIG. 2, enhanced feature environment 200 includes two exemplary productivity applications 201 and 221, each used by different users A and B respectively. Thus, user A is associated with productivity application 201 and user B with productivity application 221.

It should be understood that productivity applications 201 and 221 may be the same application, different versions of the same application, or different applications entirely. Examples of productivity applications include office productivity suites, accounting software, graphics applications, gaming applications, database programs, and any number of other types of applications. As mentioned, examples of application data with which users interact include word processing documents, spreadsheets, databases, photos, game environments, and the like.

At step 103 service applications associated with the user are identified. In the illustrated example, enhanced feature environment 200 includes service application 215, service application 217, and service application 219. It is also shown in the illustrated example that service application 215 is associated with three different users: user A, user M, and user N. Service application 217 is illustrated as associated with three users: user A, user B, and user N. Service application 219 is also shown in the illustrated example as associated with three users: user M, user B, and user N. User A would therefore be associated with service applications 215 and 217, and user B with service applications 217 and 219. It should be understood that the term service may be used interchangeably with service application. For example, a social network may be considered a service, while a web server through which a user accesses the social network may run an application or applications that provide the service.

Lastly, at step 105 service features corresponding to the identified service applications are enabled. Within productivity applications 201 and 221 are shown productivity features 203 and 223 respectively. Productivity feature 203 includes service feature 205 corresponding to service application 215, and service feature 207 corresponding to service application 217. Productivity feature 223 includes service feature 225, which is assumed to correspond to service application 215. Productivity feature 223 also includes service feature 227 corresponding to service application 217.

Service feature 209 is assumed to correspond to service application 219 and is shown as a feature of productivity application 201, but not as a sub-feature of productivity feature 203. Service feature 229 is assumed to correspond to service application 219, but is shown as a feature of productivity application 221, not as a sub-feature of productivity feature 223. This is intended to demonstrate that while some service features may be sub-features of a productivity feature, others may be individual features that are not sub-features of productivity features. In fact, it should be understood that some service features may themselves be considered productivity features.

Here, service feature 205 and service feature 207 are shown as enabled for user A, while service feature 209 is represented as disabled by way of shading. Likewise, service feature 227 and service feature 229 are shown as enabled, while service feature 225 is represented as disabled by way of shading. It should be understood that any service feature could be dynamically enabled, whether a sub-feature of a productivity feature or not.

Referring now FIG. 3, feature enablement system 300 and the associated discussion are intended to provide a brief, general description of a suitable computing environment in which process 100 may be implemented. Many other configurations of computing devices and software computing systems may be employed to implement a system for dynamically enabling service features.

Feature enablement system 300 may be any type of computing system capable of dynamically enabling service features within productivity applications, such as a server computer, client computer, internet appliance, or any combination or variation thereof. FIG. 4, discussed in more detail later, provides examples of computing systems. Indeed, feature enablement system 300 may be implemented as a single computing system, but may also be implemented in a distributed manner across multiple computing systems. For example, feature enablement system 300 may be representative of a server system (not shown) with which the computer systems (not shown) running productivity applications 201 and 221 may communicate to enable service features. However, feature enablement system 300 may also be representative of the computer systems that run productivity applications 201 and 221. Indeed, feature enablement system 300 is provided as an example of a general purpose computing system that, when implementing process 100, becomes a specialized system capable of dynamically enabling service features.

Feature enablement system 300 includes processing system 301, storage system 303, and feature enablement software 305. Processing system 301 is communicatively coupled with storage system 303. Storage system 303 stores feature enablement software 305 which, when executed by processing system 301, directs feature enablement system 300 to operate as described for process 100 and enhanced feature environment 200.

Referring still to FIG. 3, processing system 301 may comprise a microprocessor and other circuitry that retrieves and executes feature enablement software 305 from storage system 303. Processing system 301 may be implemented within a single processing device but may also be distributed across multiple processing devices or sub-systems that cooperate in executing program instructions. Examples of processing system 301 include general purpose central processing units, application specific processors, and graphics processors, as well as any other type of processing device.

Storage system 303 may comprise any storage media readable by processing system 301 and capable of storing feature enablement software 305. Storage system 303 may include volatile and nonvolatile, removable and non-removable media implemented in any method or technology for storage of information, such as computer readable instructions, data structures, program modules, or other data. Storage system 303 may be implemented as a single storage device but may also be implemented across multiple storage devices or sub-systems. Storage system 303 may comprise additional elements, such as a controller, capable of communicating with processing system 301.

Examples of storage media include random access memory, read only memory, magnetic disks, optical disks, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Feature enablement software 305 comprises computer program instructions, firmware, or some other form of machine-readable processing instructions having process 100 embodied therein. Feature enablement software 305 may be implemented as a single application but also as multiple applications. Feature enablement software 305 may be a stand-alone application but may also be implemented within other applications distributed on multiple devices, including but not limited to productivity application software and operating system software.

In general, feature enablement software 305 may, when loaded into processing system 301 and executed, transform processing system 301, and feature enablement system 300 overall, from a general-purpose computing system into a special-purpose computing system customized to dynamically enable service features within a productivity application as described by process 100 and its associated discussion.

Encoding feature enablement software 305 may also transform the physical structure of storage system 303. The specific transformation of the physical structure may depend on various factors in different implementations of this description. Examples of such factors may include, but are not limited to: the technology used to implement the storage media of storage system 303, whether the computer-storage media are characterized as primary or secondary storage, and the like.

For example, if the computer-storage media are implemented as semiconductor-based memory, feature enablement software 305 may transform the physical state of the semiconductor memory when the software is encoded therein. For example, feature enablement software 305 may transform the state of transistors, capacitors, or other discrete circuit elements constituting the semiconductor memory.

A similar transformation may occur with respect to magnetic or optical media. Other transformations of physical media are possible without departing from the scope of the present description, with the foregoing examples provided only to facilitate this discussion.

Referring again to FIGS. 1-3, through the operation of feature enablement system 300 employing feature enablement software 305, transformations are performed on productivity applications 201 and 221. As an example, productivity application 201 or 221 could be considered transformed from one state to another by the enablement of various service features within them.

Feature enablement system 300 may have additional devices, features, or functionality. Feature enablement system 300 may optionally have input devices such as a keyboard, a mouse, a voice input device, or a touch input device, and comparable input devices. Output devices such as a display, speakers, printer, and other types of output devices may also be included. Feature enablement system 300 may also contain communication connections and devices that allow feature enablement system 300 to communicate with other devices, such as over a wired or wireless network in a distributed computing and communication environment. These devices are well known in the art and need not be discussed at length here.

Figure 6:
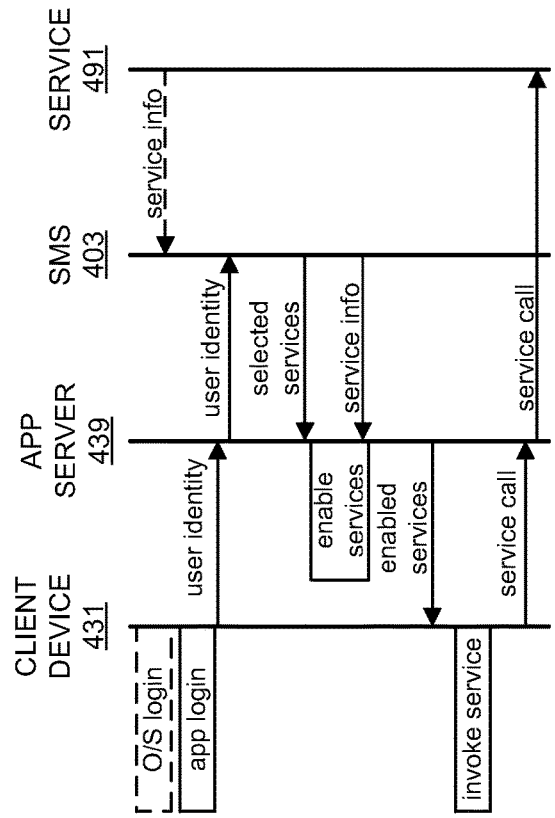
FIG. 6 illustrates an operational flow diagram in an implementation.
Figure 5:
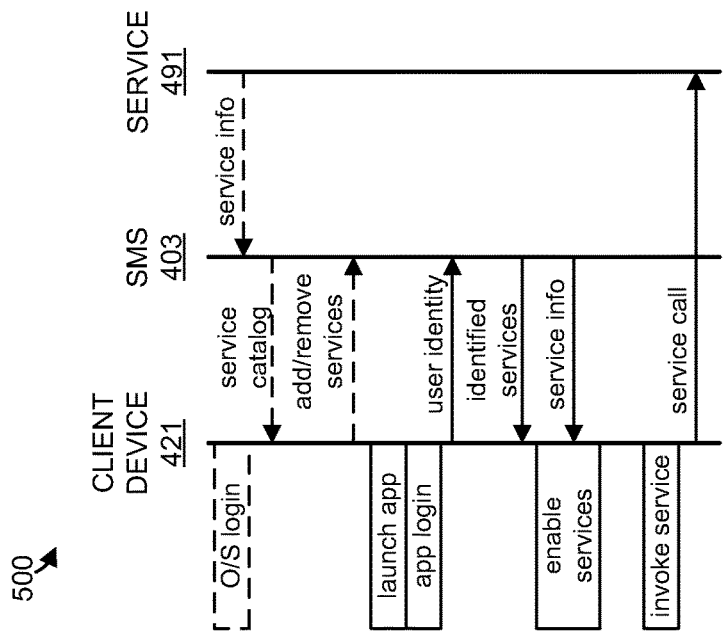
FIG. 5 illustrates an operational flow diagram in an implementation.
Figure 7:
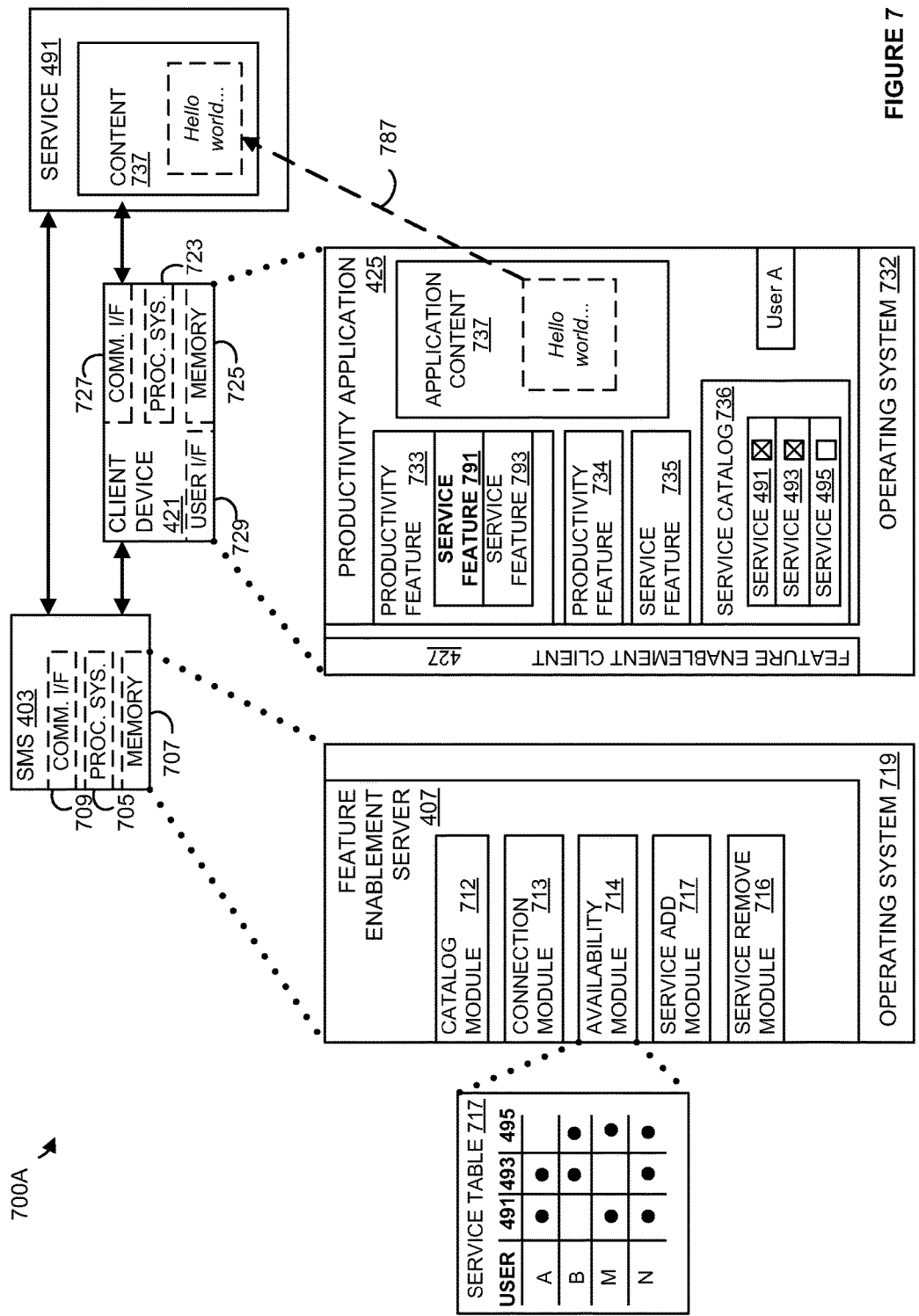
FIG. 7 illustrates an enhanced feature environment in an implementation.
Figure 8:
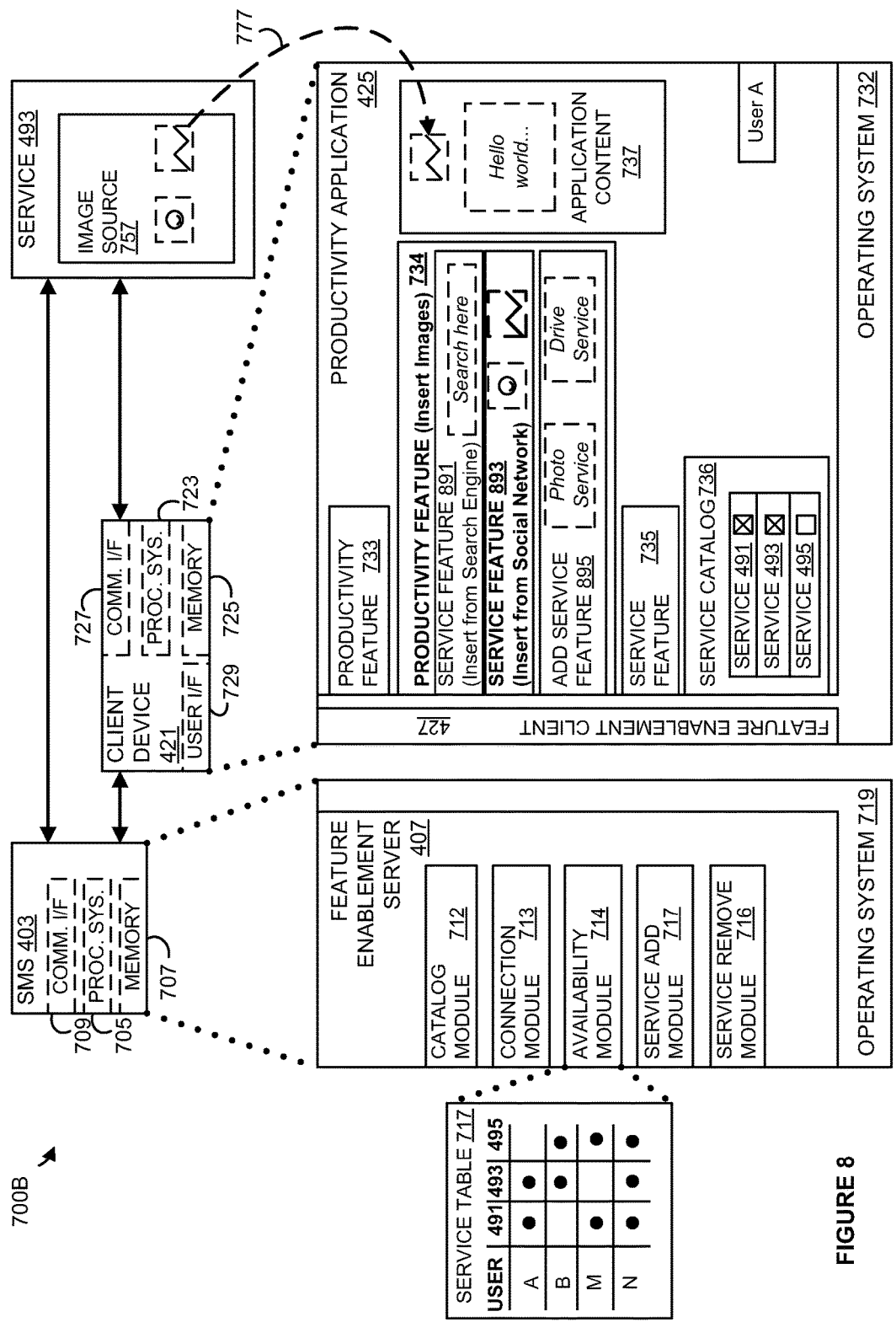
FIG. 8 illustrates an enhanced feature environment in an implementation.

FIGS. 4-8 refer to implementations whereby client devices interface with server systems to enable service features within productivity applications used by operators of the client devices. Briefly, FIG. 4 illustrates an enhanced feature environment, while FIG. 5 and FIG. 6 illustrate operational flows of data between various devices and systems within the enhanced feature environment. FIG. 7 and FIG. 8 illustrate more detailed views of elements of the enhanced feature environment and their interaction.

Referring now to FIG. 4, illustrated is enhanced feature environment 400 in an implementation. Three different scenarios are depicted within enhanced service environment 400, and within each scenario at least a hosted and non-hosted implementation. A first scenario involving client devices 421 and 431 is oriented around users identified by personal identities, and from there the relevant services identified and associated service features enabled. A second scenario involving client devices 441 and 451 is oriented around identifying users based on productivity identities, while a third scenario involving client devices 461 and 471 is oriented around identifying users based on enterprise identities.

Enhanced feature environment 400 includes open communication network 401, which could be considered to be at least a portion of what is commonly known as the Internet, and private communication network 411, which may be referred to as an intranet. Client devices 421, 431, 441, and 451 communicate over open communication network 401 with service management system 403, and in some instances with hosted application server 439.

Client devices 421, 431, 441, and 451 may also communicate with cloud services 491, 493, and 495 over open communication network 401. Cloud services are services provided over the Internet. Examples of cloud services 491, 493, and 495 include cloud drives, photo sharing websites, and social network websites, as well as any of a variety of services that may be considered cloud services due to their general availability over the Internet. Examples of client devices 421, 431, 441, and 451 include desktop and laptop computers, tablet computers, mobile communication devices, and other types of computing devices or appliances. Client devices 421, 431, 441, and 451 access open communication network 401 by way of any number of well known access technologies not shown here for the purpose of brevity. Wired or wireless access networks commonly found in homes and businesses or provided by network service providers are examples of access technologies.

Continuing with FIG. 4, client devices 461 and 471 communicate with service management system 413 over private communication network 411, and in some instances, with hosted application server 479. Client devices 461 and 471 may also communicate with cloud services 491, 493, and 495. Private communication network 411 is shown here as in communication with open communication network 401. However, it should be understood that this may be optional, and in fact, client devices 461 and 471 could communicate with cloud services 491, 493, and 495 by some other communication channel or network. Client devices 461 and 471 may also communicate with local service 497, considered a local service as opposed to a cloud service due to its general availability within an intranet, rather than over the Internet. Examples of local service 497 include cloud drives, enterprise social networks, blog sites, and the like. Examples of client devices 461 and 471 include desktop and laptop computers, tablet computers, mobile communication devices, and other types of computing devices or appliances. Client devices 461 and 471 access private communication network 411 by way of any number of well known wired or wireless access technologies not shown here for the purpose of brevity.

Referring now to the first scenario, in the illustrated example client device 421 includes feature enablement client 427, productivity application 425, and personal identifier 423. Productivity application 425 may be any productivity application installed on and capable of running on client device 421. A productivity application is a software program used to generate, produce, or interact with content. Examples of productivity application 425 include the Microsoft® Word document editor, the Microsoft® Excel® spreadsheet program, the Microsoft® PowerPoint® presentation program, and the Microsoft® Outlook® email and calendar program. Other examples include the Lotus Smart Suite from IBM, WordPerfect from Corel, and any other type of productivity application provided by any vendor, such as accounting and database software. Examples of content include word processing documents, spreadsheets, databases, and photos.

Feature enablement client 427 may be any application program capable of communicating with feature enablement server 407, running on service management system 403, to dynamically enable service features within productivity application 425, as will be discussed in more detail below. Feature enablement client 427 may be a stand-alone client application, but may also be integrated within productivity application 425 or integrated with operating system software.

Personal identifier 423 represents a login identity that identifies and is associated personally with a user. Examples of personal identifier 423 include, but are not limited to, a Windows Live® ID used to access a suite of services known as Windows Live® from Microsoft®, a Hotmail® identifier used to access the Hotmail® email system from Microsoft®, and a Gmail identifier to access email and other services provided by Google. Any number and variety of personal identifiers are available and are contemplated within the scope of the present discussion. A user would login to productivity application 425, or perhaps to another application or operating system running on client device 421, using personal identifier 423.

In operation, a user operating client device 421 logs into productivity application 425 with personal identifier 423. This may be done by way of a user interface provided by productivity application 425, but may also be accomplished through an operating system interface or some other type of login mechanism. Feature enablement client 427, possibly called by productivity application 425, initiates a communication with feature enablement server 407 to determine which service features within productivity application 425 to enable. Using personal identifier 423, feature enablement server 407 identifies the relevant services associated with the user and returns an indication of such to feature enablement client 427. Feature enablement client 427 communicates to productivity application 425 which service features to enable based on a correspondence between features and associated services.

Enabling the service features could occur in a number of ways. For instance, productivity application 425 may call graphics objects corresponding to the service features in order to render graphical representations of the service features. Rendering may occur by making the graphical representations active or visible to the user. In some cases, a disabled service feature may be grayed-out, while an enabled service feature may be presented in non-gray color. The graphical representations of the service features may themselves be linked to or include code that can be executed upon a user selection of the graphical representation. Common examples of such graphical representations are buttons, hyper links, and items in drop-down menus. In another example, productivity application 425 may change a value or setting within graphics objects corresponding to the service features in order to alter visual characteristics of graphical representations of the enabled service features. It should be understood that many other implementations are possible.

Once the service features are enabled, productivity application 425 makes those service features available to the user for interacting with any of cloud services 491, 493, and 495. For example, assuming cloud service 491 is a cloud drive and is associated with the user, the user would be able to save documents to the cloud drive. Likewise, the user would be able to upload photos or share content with cloud services 491, 493 and 495 in certain examples, or download content from the services. In another example, assuming cloud service 491 is a social networking website, the user would be able to upload content such as photos or word processing documents to the social networking website.

As further shown in FIG. 4, client device 431 includes hosted application 435 and personal identifier 433. As with client device 421, personal identifier 433 represents a login identity used by a user to access personal services associated with the user, such as webmail, messaging, and the like. Hosted application 435 is a productivity application running as a client instance on client device 431, such as within a web browser application, which is hosted by and served from hosted application server 439. Examples of hosted application 435 include, but are not limited to, the hosted versions of the Word™ document editor, the Excel® spreadsheet program, the PowerPoint® presentation program, and the Outlook® email and calendar program, all provided within the hosted version of the Microsoft® Office™ suite of productivity applications. Other examples include the Google Docs suite of applications from Google and the Zoho office suite from Zoho. Yet other examples include any other type of hosted productivity application provided by any vendor, such as accounting and database software, gaming applications, and communication applications provided online. Hybrid applications that may run in hosted modes but also in non-hosted modes, such as a local cache mode, are also contemplated within the scope of this discussion.

In operation, a user operating client device 431 logs into hosted productivity application 435 with personal identifier 433. This may be done by way of a user interface provided by the web browser or other client interface through which the user accesses hosted productivity application 435, but may also be accomplished through an operating system interface or some other type of login mechanism. Feature enablement client 437, running on hosted application server 439, initiates a communication with feature enablement server 407 to determine which service features within hosted productivity application 435 to enable. Using personal identifier 433, feature enablement server 407 identifies the relevant services associated with the user and returns an indication of such to feature enablement client 437. Feature enablement client 437 communicates to hosted productivity application 435 which service features to enable based on a correspondence between features and associated services. Once enabled, hosted productivity application 435 would make those service features available to the user for interacting with any of cloud services 491, 493, and 495 as discussed above for productivity application 425.

Referring now to the second scenario mentioned above, client device 441 includes productivity application 445 and productivity identifier 443. Examples of productivity application 445 include those office suites provided by Microsoft®, IBM, and Corel mentioned above, as well as any other type of productivity application. Feature enablement client 447 may be any application program capable of communicating with feature enablement server 407, running on service management system 403, to dynamically enable service features within productivity application 445, as will be discussed in more detail below.

Productivity identifier 443 represents a login identity that identifies and is associated with an organization to which the user may belong, such as a business or school that allows the provider of productivity application 445 to manage and administer the provisioning of productivity application 425. For example, an organization may federate their active directory to Microsoft®, provider of the Office 365™ product suite. While Office 365™ is a set of Internet-based applications, it is contemplated herein the user may still use locally installed versions of these productivity applications while identified by their Office 365™ identity. Thus, productivity identifier 443 is one associated directly with productivity application 425. One example identifier is JohnSmith@O365.com. Any number and variety of productivity identifiers are available and are contemplated within the scope of the present discussion. A user would login to productivity application 445, or perhaps to another application or operating system running on client device 441, using productivity identifier 443.

In operation, a user operating client device 441 logs into productivity application 445 with productivity identifier 443. This may be done by way of a user interface provided by productivity application 445, but may also be accomplished through an operating system interface or some other type of login mechanism. Feature enablement client 447, possibly called by productivity application 445, initiates a communication with feature enablement server 407 to determine which service features within productivity application 445 to enable. Using productivity identifier 443, feature enablement server 407 identifies the relevant services associated with the user and returns an indication of such to feature enablement client 447. Feature enablement client 447 communicates to productivity application 445 which service features to enable based on a correspondence between features and associated services.

Once the service features are enabled, productivity application 445 makes those service features available to the user for interacting with any of cloud services 491, 493, and 495, for example to upload files, photos, or other such content to any of the services, or download content from the services. As mentioned, enabling the service features could occur in a number of ways. Among many possibilities, some examples include calling graphics objects corresponding to the service features in order to render graphical representations of the service features, as well as changing a value or setting within graphics objects corresponding to the service features in order to alter visual characteristics of graphical representations of the enabled service features.

As further shown in FIG. 4, client device 451 includes hosted application 455 and productivity identifier 453. As with client device 441, productivity identifier represents a login identity that binds a user with an organization that allows a product provider to manage and administer the provisioning of hosted productivity application 455. An Office 365™ identity such as JohnSmith@O365.com is one example. Hosted application 455 is a productivity application running as a client instance on client device 451, such as within a web browser application, which is hosted by and served from hosted application server 439. Examples of hosted application 455 include the hosted versions of the Word™ document editor, the Excel® spreadsheet program, the PowerPoint® presentation program, and the Outlook® email and calendar program, all provided within the Microsoft® Office 365™ suite of productivity applications. Other examples include the Google Docs suite of applications from Google, and the Zoho office suite from Zoho.

In operation, a user operating client device 451 logs into hosted productivity application 455 with productivity identifier 453. This may be done by way of a user interface provided by the web browser or other client interface through which the user accesses productivity application 455, but may also be accomplished through an operating system interface or some other type of login mechanism. Feature enablement client 437, running on hosted application server 439, initiates a communication with feature enablement server 407 to determine which service features within hosted productivity application 455 to enable. Using productivity identifier 453, feature enablement server 407 identifies the relevant services associated with the user and returns an indication of such to feature enablement client 437. Feature enablement client 437 communicates to hosted productivity application 455 which service features to enable based on a correspondence between features and associated services. Once the service features are enabled, productivity application 455 would make those service features available to the user for interacting with any of services 491, 493, and 495 as discussed above for productivity application 445.

Referring now to the third scenario mentioned above, client device 461 includes productivity application 465 and enterprise identifier 463. Productivity application 465 may be any productivity application installed on and capable of running on client device 461. Examples of productivity application 465 include those provided by Microsoft®, IBM, and Corel mentioned above. Feature enablement client 467 may be any application program capable of communicating with feature enablement server 417, running on service management system 413, to dynamically enable service features within productivity application 465, as will be discussed in more detail below.

Enterprise identifier 463 represents a login identity that identifies and is associated with an organization encompassing the user, such as a company or school that itself manages and administers the provisioning of productivity application 465. Examples of productivity applications include the Word™, Excel®, PowerPoint®, and Outlook® applications from Microsoft®. Thus, enterprise identifier 463 is one associated with the organization, such as acme\JohnSmith. Any number and variety of enterprise identifiers are available and are contemplated within the scope of the present discussion. A user would login to productivity application 465, or perhaps to another application or operating system running on client device 461, using enterprise identifier 463.

In operation, a user operating client device 461 logs into productivity application 465 with enterprise identifier 463. This may be done by way of a user interface provided by productivity application 465, but may also be accomplished through an operating system interface or some other type of login mechanism. Feature enablement client 467, possibly called by productivity application 465, initiates a communication with feature enablement server 417 to determine which service features within productivity application 465 to enable. Using enterprise identifier 463, feature enablement server 417 identifies the relevant services associated with the user and returns an indication of such to feature enablement client 467. Feature enablement client 467 communicates to productivity application 465 which service features to enable based on a correspondence between features and associated services.

Once the service features are enabled, productivity application 465 makes those service features available to the user for interacting with any of services 491, 493, and 495, such as to upload content to the services or download content from the services. A service feature or feature corresponding to service 497 may also be enabled. As mentioned, enabling the service features could occur in a number of ways. Among many possibilities, some examples include calling graphics objects corresponding to the service features in order to render graphical representations of the service features, as well as changing a value or setting within graphics objects corresponding to the service features in order to alter visual characteristics of graphical representations of the enabled service features.

As further shown in FIG. 4, client device 471 includes hosted application 475 and enterprise identifier 473. As with client device 461, enterprise identifier represents a login identity that binds a user with an organization that manages and administers the provisioning of hosted productivity application 475. Hosted application 475 is a productivity application running as a client instance on client device 471, such as within a web browser application, which is hosted by and served from hosted application server 479. Examples of hosted application 475 include the hosted versions of the Word™ document editor, the Excel® spreadsheet program, the PowerPoint® presentation program, and the Outlook® email and calendar program, all from Microsoft®. Other examples include the Google Docs suite of applications from Google which can also be hosted locally.

In operation, a user operating client device 471 logs into hosted productivity application 475 with enterprise identifier 473. This may be done by way of a user interface provided by the web browser or other client interface through which the user accesses productivity application 475, but may also be accomplished through an operating system interface or some other type of login mechanism. Feature enablement client 477, running on hosted application server 479, initiates a communication with feature enablement server 417 to determine which service features within hosted productivity application 475 to enable. Using enterprise identifier 473, feature enablement server 417 identifies the relevant services associated with the user and returns an indication of such to feature enablement client 477. Feature enablement client 477 communicates to hosted productivity application 475 which service features to enable based on a correspondence between features and associated services. Once the service features are enabled, productivity application 475 would make those service features available to the user for interacting with any of services 491, 493, and 495 as discussed above for productivity application 465.

FIG. 5 illustrates an operational flow diagram 500 that demonstrates one example data exchange between client device 421, service management system 403, and service 491 in order to illustrate some operations of enhanced feature environment 400. In this scenario, the user launches a productivity application on client device 421. Client device 421 provides a user identity to service management system 403. The user identity may have been provided by the user during a login operation to the productivity application, or alternatively during a login operation to the operating system.

In one implementation, a Relying Party Suite (RPS) exchange is employed to authenticate and identify the user to service management system 403. In an RPS implementation, client device 421 communicates with a login server (not shown) to authenticate the user. Assuming the user is authenticated, the login server may provide client device with a ticket or token used to authenticate the user to service management system 403. Client device 421 presents the ticket to service management system 403, which then proceeds to communicate with the login server to confirm the authenticity of the user. It should be understood that a wide variety of other techniques could be used to identify the user.

Regardless, service management system 403 proceeds to identify which services are associated with the user and returns an indication of the selected services to client device 421. A more detailed discussion of how service management system 403 identifies the associated services is provided below with respect to FIG. 7 and service table 717.

Client device 421 then enables the service features within the productivity application that correspond to the selected services. In some implementations, client device 421 may also determine which service features correspond to the selected services. For example, feature enablement client 427 running on client device 421 may access a feature table that stores the identity of various service features in association with various services. Upon receiving from service management system 403 an identification of which services are associated with the user, feature enablement client 427 may then access the feature table to determine in particular which service features to enable.

Alternatively, the feature table could be maintained by another system (not shown) remote from client device 421. Feature enablement client 427 could query that system to obtain information pertaining to which service features to enable. In another alternative, service management system 403 may itself store the feature table and provide feature enablement client 427 with information indicating which service features to enable.

In yet another example, each service feature within productivity application 425 could be self-enabled. This may occur by each service feature querying a service table stored in client device 421, or alternatively stored remotely from client device 421, to determine which services were identified by service management system 403 as associated with the user. Each service feature could then be self-enabled should any of the identified services match criteria kept by each service feature.

It should be noted that service management system 403 may also return service information to client device 421 with which the productivity application can communicate with service 491. One example of service information is a service identifier that identifies an instance of a service used by the user. Another example is a list of capabilities enabled for the service. Yet another example is a user identifier used by the user on the service, such as a peer-to-peer handle or a social network username. A user profile uniform resource locator (URL) that links to a user profile for a particular service is yet another example of service information. A connection-specific URL may be provided for services that are already selected, as well as connection-specific tokens for those services for which recent sessions are still ongoing or recently stopped. Connection state information and last modified date information are other examples of service information.

In FIG. 5, it is further illustrated that service application 491 provided the service information to service management system 403. It should be understood that service 491 need not directly provide the service information in this manner. Rather, service 491 may publish some of the information, which would then be obtained by personnel or automated tools involved with maintaining and programming service management system 403. Service management system 403 may also obtain the service information client devices 421 in some scenarios. A variety of implementations are possible for providing service management system 403 with the service information.

Service 491 can be invoked by way of, for example, selection of an enabled service feature that corresponds to the service. Client device 421 then generates a service call to service 491 to accomplish the function served by the enabled service feature. For example, the service feature may be a sub-feature of a send productivity feature that, when invoked, allows for sending of content from client device 421 to a social networking website. In another example, the service feature may be a sub-feature of a save productivity feature that, when invoked, allows for saving of content generated on client device 421 to a cloud storage service. It should be understood that a productivity feature and service features may be considered commands or some other type of control that invokes their associated functions, such as sending, sharing, or saving content.

FIG. 6 illustrates operational flow diagram 600 that demonstrates another possible scenario involving a hosted application. In this scenario, client device 431 provides a user identity corresponding to the user to hosted application server 439. The user identity may have been provided by the user during a login operation to the productivity application, or alternatively during a login operation to the operating system.

Regardless, application server 439 authenticates the user and forwards the user identity to service management system 403, for example by transferring a request for delivery to service management system 403 over open communication network 401. Service management system 403 proceeds to identify which services are associated with the user and returns, by way of a response delivered over open communication network 401, an indication of the selected services to application server 439. Service management system 403 may also return service information to application server 439 with which the productivity application uses to communicate with service 491. As discussed above, some examples of service information include service identifiers, enabled capabilities for the service, usernames for a service, user profile URLs, connection-specific URLs, tokens, and the like.

In FIG. 6, it is shown that service application 491 may provide the service information to service management system 403. It should be understood that this need not occur in a direct manner, but rather may involve personnel obtaining the service information from published resources and manually maintaining and programming service management system 403 or using automated tools. In other implementations, service management system 403 actively queries the services on behalf of users to obtain the service information. In yet other implementations, service management system 403 obtains the service information from the client devices. It should be understood that a variety of ways are possible for providing service management system 403 with the service information.

Application server 439 then enables the service features within the productivity application that correspond to the selected services. In some implementations, application server 439 may also determine which service features correspond to which selected services. As discussed above with respect to FIG. 5, a variety of mechanisms could be used to determine this correspondence, such as a feature table maintained by application server 439 or elsewhere, or by way of self-enabling service features. The enabled service features are provided to the user operating client device 431 by way of a client application, such as a web browser, that interacts with application server 439 to present the productivity application to the user with all of the relevant service features enabled.

Service 491 can be invoked by way of, for example, selection of an enabled service feature corresponding to the service. Client device 431 then generates an indication of the service call to service 491 to accomplish the function of the enabled service feature. Hosted application server 439 receives the indication and transfers a corresponding service call to service 491. For example, the service feature may be a sub-feature of a send productivity feature that, when invoked, allows for sending of content to the service 491.

FIGS. 7 and 8 illustrate enhanced feature environments 700A and 700B respectively, which show in more detail the components of the client devices and service management systems of FIG. 4, as well as the operations there between that accomplish the dynamic enablement of service features. In particular, FIG. 7 depicts an example whereby a user interacts with a service feature in a productivity application to upload content to a service. FIG. 8 depicts an example whereby the user interacts with another service feature in the productivity application to download images from a different service.

It should be understood that, while discussed in the context of client device 421, the operations described in FIG. 7 and FIG. 8 are widely applicable to the other devices in enhanced feature environment 400 of FIG. 4. Likewise, the structural elements of the devices depicted in FIGS. 7 and 8 are generally applicable as well to the devices and systems shown in FIG. 4, although some variations may exist.

In FIG. 7, enhanced feature environment 700A includes service management system 403, client device 421, and service 491. Service management system 403 communicates with client device 421, as well as with service 491. Likewise, client device 421 communicates with service management system 403 as well as service 491.

Service management system 403 includes processing system 705, communication interface 709, and memory 707. Processing system 705 is operatively linked with communication interface 709 and memory 707, and is capable of executing software stored in memory 707. When executing the software, processing system 705 generally drives service management system 403, including communication interface 709, to operate as described herein. Examples of processing system 705 include, but are not limited to, general purpose central processing units, application specific processors, and graphics processors. Examples of memory 707 include random access memory, read only memory, magnetic disks, optical disks, and flash memory, as well as any combination or variation thereof, or any other type of storage media. Communication interface 708 may include communication connections and devices that allow service management system 403 to communicate with other devices, such as over a wired or wireless network in a distributed computing and communication environment.

As mentioned, processing system 705 executes software stored in memory 707. FIG. 7 provides an expanded view of the software contained in memory 707, including feature enablement server 407 and operating system 719. Feature enablement server 407 includes catalog module 712, connection module 713, service add module 715, and service remove module 716.

Catalog module 712 provides a catalog of possible services a user may access. Connection module 714 monitors which services a user is presently connected to, while availability module 714 tracks which services a user is associated with and may want connect to, both of which will be discussed in more detail below. Service add module 715 provides a mechanism by which a user may add new services by way of connection module 713 and availability module 714. Likewise, service remove module 716 provides a mechanism by which a user may remove services.

Also provided is service table 717, which maintains information about various users and their association with various services. Service table 717 is illustrated with relative simplicity to show how availability module 714 may determine which services are associated with which users. In this brief example, user A is associated with services 491 and 493; user B is associated with services 493 and 495; user M is associated with service 491 and 495; and user N is associated with all three services 491, 493, and 495. Upon receiving a request from a client device to identify the relevant services associated with a user, availability module 714, perhaps alone or in combination with connection module 713, would access service table 717 to identify the services associated with that user. More complex ways to track this information and more complex data structures, other than a table, are possible. Other modules may also operate on or access service table 717.

Service table 717 could be maintained in a number of ways. In one implementation, service table 717 is populated on a per-user basis at the time a request is made to determine with which services a user is associated. In this implementation, service management system 403 communicates with cloud service 491, 493, and 495 to determine if the requesting user is associated with each of the services and populates service table 717 accordingly. In other implementations, service management system 403 could periodically query cloud services 491, 493, and 495 to determine which services to associate with which users. In either case, service management system 403 may query at least some of the cloud services using the login identity provided by the user to use productivity application 425 if that login identity is the same identity with which the user accesses those cloud services. However, service management system 403 may query the cloud services with a different identity for the user, such as a service-specific identity. The service-specific identity could be provided by the user through service catalog 736 at the time the user selects which services with which to be associated.

In yet another implementation, service table 717 could be populated based on information provided by the client devices. For instance, based on the user selection of at least a subset of services in service catalog 736, feature enablement client 427 could communicate these selections to service management system 403 for storing in service table 717. In this example, the subset of selected services includes service 491 and 493.

Combinations and variations of these implementations are also possible. For instance, service table 717 may initially be populated based on information provided by client devices, but then subsequently updated on a periodic basis or on a per-request basis.

Client device 421 includes processing system 723, memory 725, communication interface 727, and user interface 729. Processing system 723 is operatively linked with memory 725, communication interface 727, and user interface 729, and is capable of executing software stored in memory 725. When executing the software, processing system 723 generally drives client device 421, including user interface 729 and communication interface 727, to operate as described herein. Examples of processing system 723 include general purpose central processing units, application specific processors, and graphics processors, as well as any other type of processing device. Examples of memory 725 include random access memory, read only memory, magnetic disks, optical disks, and flash memory, as well as any combination or variation thereof, or any other type of storage media. Communication interface 727 may include communication connections and devices that allow client device 421 to communicate with other devices, such as over a wired or wireless network in a distributed computing and communication environment. User interface 729 may have input devices such as a keyboard, a mouse, a voice input device, or a touch input device, and comparable input devices. Output devices such as a display, speakers, printer, and other types of output devices may also be included.

As mentioned, processing system 723 executes software stored in memory 725. FIG. 7 provides an expanded view of the software contained in memory 725, including productivity application 425, feature enablement client 427, and operating system 732.

Productivity application 425 includes productivity feature 733, productivity feature 734, and service feature 735. FIG. 7 further illustrates service features contained within productivity feature 733, including service feature 791 and service feature 793. Service feature 791 is intended to correspond to service 491 shown in FIG. 4. Likewise, service feature 793 is intended to correspond to service 493 shown in FIG. 4. Together, the depiction of service features 791 and 793 within productivity feature 733 is intended to demonstrate the enablement of both features based on the association of user A, logged into productivity application 425, with services 491 and 493. In fact, service table 717 in service management system 403 also demonstrates these relationships.

As can be seen, productivity application 425 also includes service catalog 736. Service catalog 736 includes graphical representations of service 491, service 493, and service 495, corresponding to the same services shown in FIG. 4. In this example, service 491 is shown as selected, as is service 493. This selection is communicated from client device 421 by way of communication interface 727 to service management system 403, and is ultimately stored in service table 717.

Service catalog 736 may be presented to the user at various times. For instance, the user may be presented with service catalog 736 upon launching a productivity application. This may occur each time, but could also occur periodically, or when new services are available. Service catalog 736 could also be presented upon selection by the user, such as by making a selection in a feature menu to launch service catalog 736. Service catalog 736 may also be presented to the user upon selection of a productivity feature. For instance, the user may select a save productivity feature, upon which service catalog 736 could be presented to the user.

It should be understood that service catalog 736 need not be presented as a distinct catalog or stand-alone element. Rather, the presentation of the graphical representations of services 491, 493, and 495 may occur within productivity features, such as features 733, 734, and 735. Service catalog 736 may also be integrated with and presented as a part of operating system 732. Other implementations and presentations of service catalog 736 are contemplated and should not be limited to those discussed herein. Service catalog 736 may communicate with catalog module 712 to obtain information with which to populate the catalog.

It should be understood that the various elements of productivity application 425, along with the application itself, may be presented to a user by of way user interface 729. While productivity application 425 and its elements reside in memory 725 as software, the execution of the software by processing system 723 drives user interface 729 to display various aspects of operating system 732 and productivity application 425 to the user, for example by displaying images on a display system. Likewise, user interface 729 may include other input components that allow the user to interact with productivity application 425, such as by clicking with a mouse or indicating with some other input device a selection of any of the productivity features, service features, or catalog elements shown in FIG. 7.

The following discusses the operation of enhanced feature environment 700A in an implementation. In this implementation, through an interaction between client device 421 and service management system 403, a service feature is enabled and invoked corresponding to service 491. This is an exemplary illustration that could apply to any of the other elements shown in FIG. 400, possibly with some variation, but is limited to interaction between client device 421 and service management system 403 for the sake of clarity.

In operation, user A is logged into productivity application 425. User A could alternatively, or simultaneously, be logged into operating system 732, as well as logged into some other application that could communicate the identity of the user to productivity application 425. In this example, user A has logged in under a personal identity, as explained with respect to FIG. 4. In operation, the user works with productivity application 425 to generate application content 737, which in this example is a word processing document. Productivity features 733 and 734 and service feature 735 are available to the user within productivity application 425 by way of a graphical user interface displayed to the user on user interface 729.

Feature enablement client 427 determines which service features to enable within productivity application 425. Feature enablement client 427 queries feature enablement server 407 by way of communication between client device 421 and service management system 403. As mentioned, service management system 403 maintains service table 717, which stores user identities in association with various services. In table 717, user A is associated with service 491 and service 493. User B is associated with services 493 and 495. User M is associated with service 491 and 495. User N is associated with all three services 491, 493, and 495. These associations are made as a result of users providing the associations to service management system 403, or by some other means. As discussed above, the user may provide these associations through service catalog 736, for example.

To determine which features to enable for a given productivity application associated with a given user, table 717 is consulted or otherwise interrogated by availability module 714 to identify which services are associated with that user. Since productivity application 425 is associated with user A, service feature 791, corresponding to service 491, is enabled and available to the user. Likewise service feature 793, corresponding to service 493, is enabled. However, no such service feature corresponding to service 495 is enabled, as evidenced by its absence from the display of productivity application 425.

Enhanced feature environment 700A also intends to show that service features can be sub-features of productivity features. For example, service feature 791 and service feature 793 are shown as sub-features of productivity feature 733. It should be understood that FIG. 7 shows productivity features in an expanded view merely to demonstrate the enablement of service features within it, while it is contemplated that productivity feature 734 and service feature 735 may themselves include other sub-features or service features that could also be enabled.

The service features enabled with productivity feature 733 may provide any number of functions. In this case, it is assumed for illustrative purposes that productivity feature 733 is a send feature, and that service feature 791 allows productivity feature 733 to send content 737 to service 491, shown by arrow 787. Service 491 is thus able to host content 737, upon its generation and transfer by productivity application 425.

As mentioned above, enabling the service features could occur in a number of ways. Among many possibilities, some examples include calling graphics objects corresponding to the service features in order to render graphical representations of the service features, as well as changing a value or setting within graphics objects corresponding to the service features in order to alter visual characteristics of graphical representations of the enabled service features. The graphics objects may have executable code associated with them that provide the operational functionality desired by the user to be applied to content. For instance, a save feature would drive client device 421 to save content. Likewise, a send feature would contain code that drives client device 421 to send content to a destination.

Referring now to FIG. 8, enhanced feature environment 700B includes service management system 403, client device 421, and service 493. Service management system 403 communicates with client device 421, as well as with service 493. Likewise, client device 421 communicates with service management system 403 as well as with service 493.

The following discusses the operation of enhanced feature environment 700B in an implementation. In this implementation, through an interaction between client device 421 and service management system 403, a service feature is enabled and invoked corresponding to service 493. This is an exemplary illustration that could apply to any of the other elements shown in FIG. 400, possibly with some variation, but is limited to interaction between client device 421 and service management system 403 for the sake of clarity.

As discussed above with respect to FIG. 7, user A is logged into productivity application 425, but could alternatively or simultaneously be logged into operating system 732. In this example, user A has logged in under a personal identity, as explained with respect to FIG. 4. In operation, the user works with productivity application 425 to generate application content 737, which in this example is a word processing document. Productivity features 733 and 734 and service feature 735 are available to the user within productivity application 425 by way of a graphical user interface displayed to the user on user interface 729.

Feature enablement client 427 determines which service features to enable within productivity application 425. Feature enablement client 427 queries feature enablement server 407 by way of communication between client device 421 and service management system 403. Since productivity application 425 is associated with user A, services features corresponding to those services associated with user A would be enabled. Service table 717 shows that user A is associated with service 491 and 493. Therefore, service features associated with services 491 and 493 are enabled. For illustrative purposes, it is assumed here that service feature 893 is associated with serviced 493, and thus it is enabled and made available to the user.

In this case, it is assumed for illustrative purposes that productivity feature 734 is an insert images feature that allows a user to insert images into application content 737. Service feature 891 is provided as a specific insert feature corresponding to a search engine (not shown) that allows a user to search for images or other content to insert into application content 737. Service feature 893 is provided as a specific insert feature corresponding to service 493 that allows the user to insert images from image source 757 in service 493. It is assumed for illustrative purposes that the user has selected service feature 893 and elected to download and insert an image from image source 757 into application content 737, as indicated by arrow 777. The image is transferred from service 493 and embedded into application content 737.

It should be noted that within service features 891 and 893 graphics can be surfaced that relate to what can be inserted into application content 737. In the case of service feature 891, a search box can be displayed to the user into which the user can enter search terms. With respect to service feature 893, representations of the images stored in image source 757 can be displayed to the user, allowing the user to select the desired image or images for insertion into application content 737. The user is also able to add service features by way of the add service feature 895. Within add service feature 895, graphical representations of two possible services—a photo service and a drive service to which the user may want to connect and add as a relevant service—are displayed. While add service feature 895 is shown as a sub-feature of productivity feature 895, it should be understood that a similar add feature could be provided as a stand-alone feature or as a sub-feature of other productivity features.

In FIG. 8, service feature 891 is provided along with service feature 893 to demonstrate that, while some service features corresponding to services associated with the user may be dynamically enabled, other service features may be enabled or otherwise surfaced to the user even if association between the user and a corresponding service exists. In this example, service feature 891 corresponds to a search engine service, while service feature 893 corresponds to service 493. This is intended to demonstrate that service features associated with services other than those associated with the user can be surfaced within productivity application 425.

As mentioned above, enabling the service features could occur in a number of ways. Among many possibilities, some examples include calling graphics objects corresponding to the service features in order to render graphical representations of the service features, as well as changing a value or setting within graphics objects corresponding to the service features in order to alter visual characteristics of graphical representations of the enabled service features. The graphics objects may have executable code associated with them that provide the operational functionality desired by the user to be applied to content. For instance, a save feature would drive client device 421 to save content. Likewise, a send feature would contain code that drives client device 421 to send content to a destination.

The following discussion pertains to various implementations involving the Microsoft® Office™ suite of applications. In addition, FIGS. 9 and 10 contain screen shots illustrating user interfaces that a user may encounter when services provided by Microsoft® and other third-party providers are connected to and integrated with their Office™ applications. As the user selects and uses these services, either or both the client running Office™ or a services manager communicating with the client maintains these services, even as the user may roam from device to device. Any Office™ client, whether running on web, mobile, desktop, or laptop platforms, or any other kind of platform, may interact with the services manager to accomplish this.

The services manager may itself be a hosted service that authenticates the user and returns information about services to which the user is already connected or those that are available for connecting by the user. The services manager communicates with these various services to obtain the information needed to enable the corresponding service features. As this information may change from time to time, this allows productivity applications to avoid obsolescence as services change or new services become available. This is accomplished by way of the services manager interfacing with the services, and then in turn interfacing with the productivity applications to enable the service features.

In this example, the user may be identified in several ways, including by a Windows Live® identifier and an Office 365™ identifier. It should be understood that the user may also be identified by a third-party identifier. Once their relevant services are identified and the associated service features enabled, the user will be able to interact directly with the services, via the services features, to perform actions like uploading content to a service from within an Office™ application, or inserting content from a service directly into a document produced using an Office™ application. In addition, opening files from within an Office™ application that are stored by a cloud storage service associated with the user will be possible. Likewise, saving files to a cloud storage associated with the user will be possible from within the Office™ application. In yet another example, contacts from a social networking website associated with the user will be made available within the Office™ application.

Figure 9:
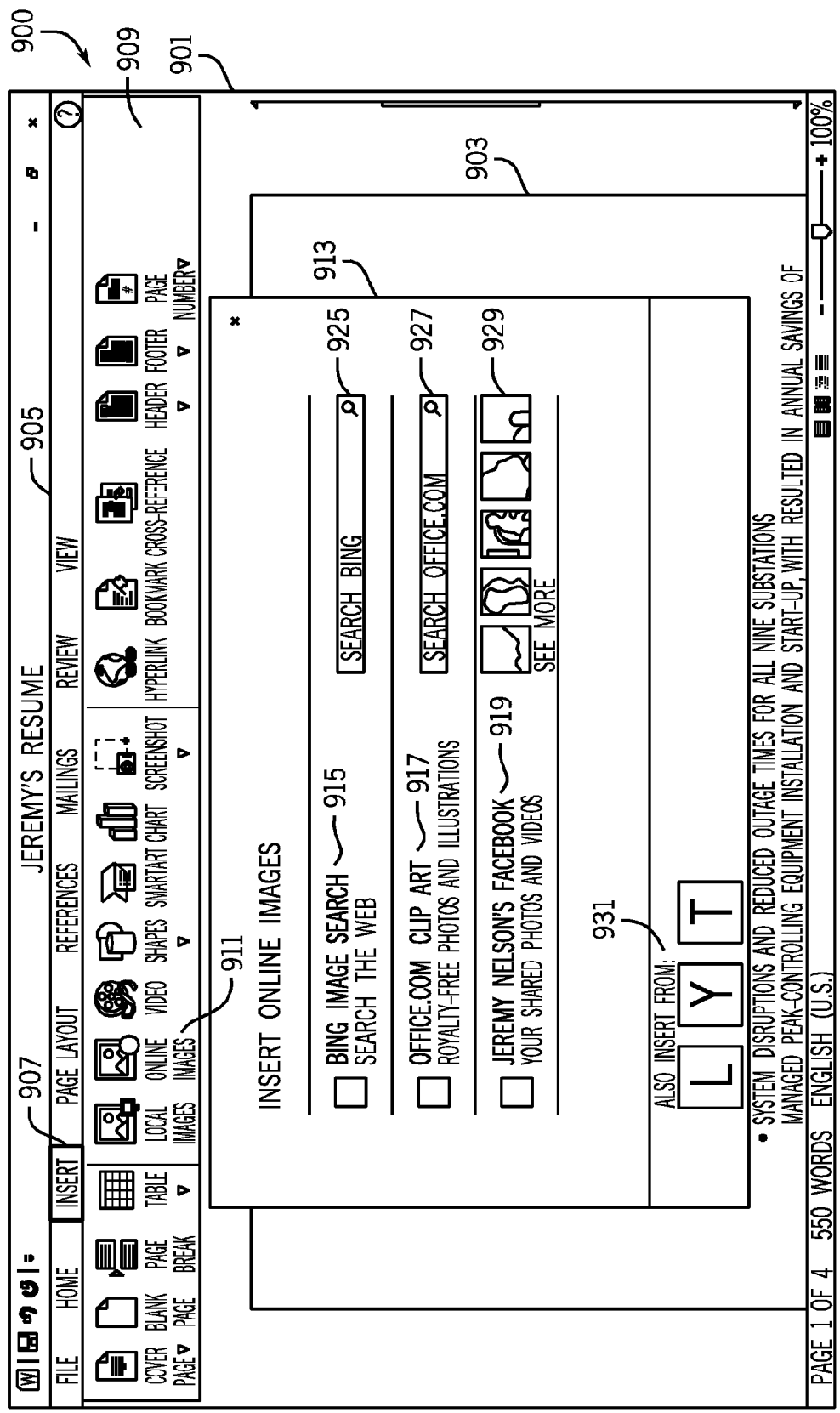
FIG. 9 illustrates a screen shot of a user interface in an implementation.

Referring now to FIG. 9, illustrated is a screen shot of a user interface 900 that may be encountered when working with a productivity application having dynamically enabled service features. In particular, user interface 900 provides a sample view in the Microsoft® Word document editor showing a sample resume produced by a sample author, Jeremy.

User interface 900 may be rendered and displayed to the user by a client device, such as those illustrated in the preceding Figures, executing productivity application 901. The user may interact with productivity application 901 to create content 903, such as a document. Productivity application 901 includes productivity feature menu 905 having graphical representations corresponding to subsets of various productivity features displayed within it. For instance, feature menu 905 includes buttons for the File, Home, Insert, Page Layout, References, Mailings, Review, and View categories of productivity features. In this example, the Insert category is selected, resulting in a view of graphical icons corresponding to productivity features within the Insert category.

As illustrated, the Insert category 907 includes many productivity features, including those allowing a user to insert local images, online images, video, shapes, smart art, charts, and screen shots. Indeed, the Insert category 907 includes several other productivity features, including the cover page, blank page, page break, table, hyperlink, bookmark, cross-reference, header, footer, and page number productivity features. These productivity features allow a user to perform a function with respect to content—namely, to insert the item represented by the graphical icons for each productivity feature. For example, by clicking on the graphical icon labeled Local Images, a productivity feature for local images would allow the user to insert a photo or other type of image stored locally. Likewise, the Insert Video productivity feature would allow the user to insert video into content 903.

Referring still to FIG. 9, user interface 900 also provides a view of service features as discussed in the implementations above. Upon selecting the Insert Online Images productivity feature 911, an insert online images menu 913 is displayed to the user. The insert online images menu 913 contains several service features available to the user that allow the user to perform functions with respect to content 903 related to online services. In this case, three service features are displayed: service feature 915, service feature 917, and service feature 919.

Service feature 915 corresponds to the online search service Microsoft® Bing™. Service feature 915 allows a user to search for images to insert into content 903 using the search service. In particular, the user could enter a search string into search box 925 within the insert online images menu 913 without having to navigate away from productivity application 901. In some implementations, service feature 915 may correspond to other online search services, including those embedded or included within other services. For instance, service feature 915 may correspond to a search tool that allows the user to search content stored within a social networking service.

Service feature 917 corresponds to the online clip art store provided by the Microsoft® Office™ service. Service feature 917 allows a user to search for images to insert into content 903 from a repository of photos and illustrations at office.com. The user is able to enter a search string into search box 927 without having to navigate away from productivity application 901.

Service feature 919 corresponds to the Facebook social networking online service. Service feature 919 allows a user to insert images 929 from their Facebook account into content 903. The user may also be able to search their Facebook account for additional images to insert.

Insert online images menu 913 also provides additional sources menu 931 that could potentially be added to the roster of enabled service features 915, 917, and 913. For instance, the user may desire to enable a service feature associated with a social network for professional networking, a web portal, or a messaging service, as well as other types of online services. The user could lick on the graphical representations of these other services within the additional sources menu 931 to initiate a process for connecting to those services and enabling their associated service features.

As mentioned with respect to the implementations discussed above, service features 915, 917, and 919 may be enabled dynamically depending upon the association of the use with their corresponding online services. For example, in user interface 900 service feature 919 is enabled as the user of productivity application 901—Jeremy—is a member of Facebook. However, some service features may be enabled all of the time, regardless of whether or not the user is associated with a corresponding online service. For example, service feature 915 corresponding to an online service may be continuously enabled.

Figure 10:
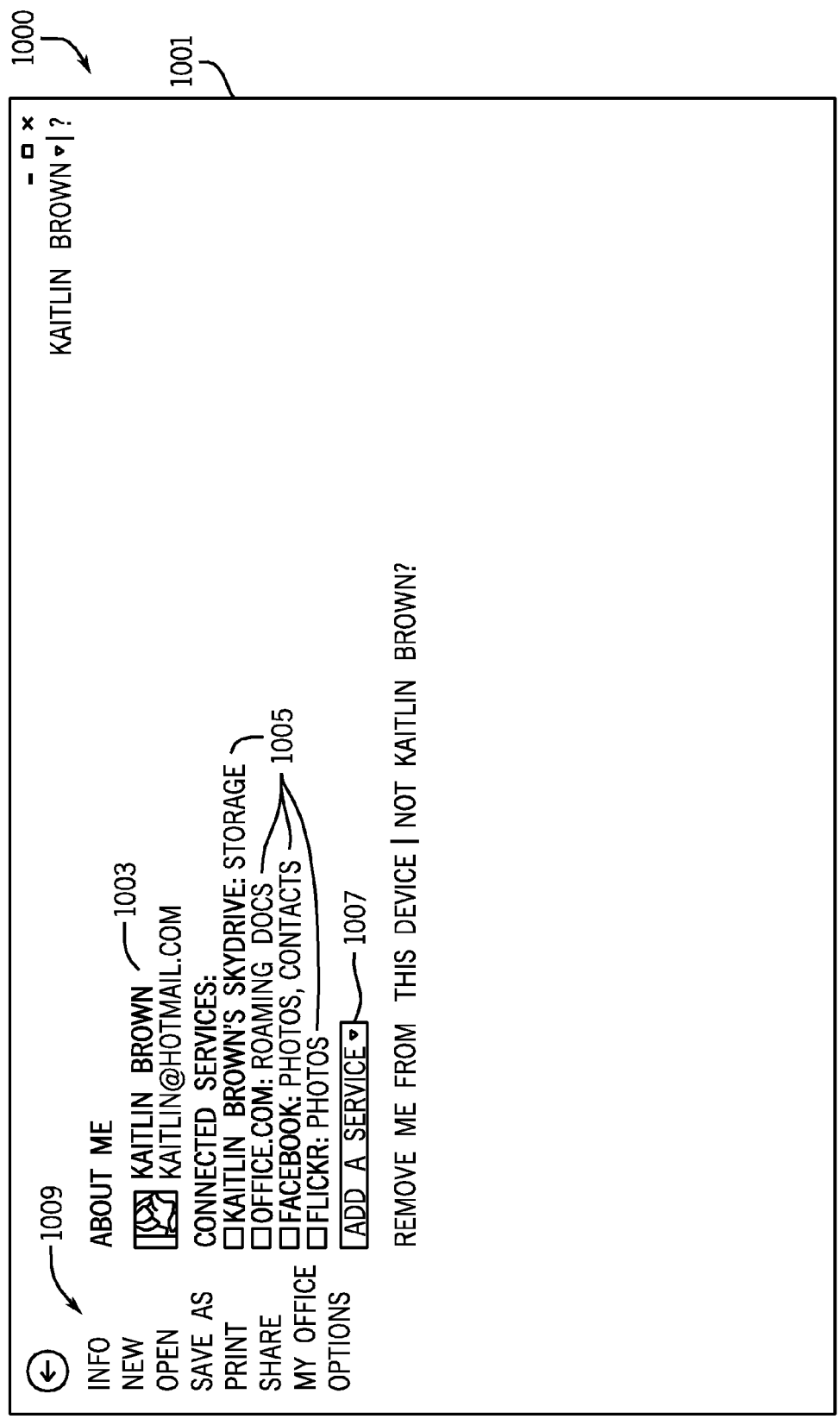
FIG. 10 illustrates a screen shot of a user interface in an implementation.

Referring now to FIG. 10, illustrated is a screen shot of a user interface 1000 from the Microsoft® Word document editor showing an account management view 1001 that allows a sample user, Kaitlin, to manage her profile of connected services. In this manner, the user is able to identify which online services she is associated with so that their corresponding service features within productivity features can be enabled.

As can be seen from user interface 1000, account management view 1001 includes an indication of the user's identity. In this case, Kaitlin is identified by a Hotmail® identifier associated with an online email service. Account management view 1001 also displays to the user a list of her connected services 1005. In this example, Kaitlin is associated with an online storage drive, an online productivity suite, a social networking online service, and an online photo service. The user is also provided with an add service function 1007 allowing the user to add or remove any services from her list of connected services 1005. Other standard features of functions are also available to the user within menu 1009, such as the new, open, save as, and print functions and features.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating enhanced productivity applications, the method comprising:
    identifying a user associated with a productivity application used to generate content;
    identifying at least a first social network service with which the user is associated and a second social network service with which the user is not associated;
    enabling a service feature within a feature menu of the productivity application, wherein the service feature corresponds to the first social network service and allows the user to perform a function on the content related to the first social network service; and,
    disabling at least one other service feature within the feature menu of the productivity application, wherein the other service feature corresponds to the second social network service.

2. The method of claim 1 wherein the service feature comprises a sub-feature of a productivity feature within the productivity application that, when invoked through a graphical user interface on a client device running the productivity application, directs the client device to initiate a communication with the first social network service.

3. The method of claim 2 wherein identifying the user associated with the productivity application comprises, in a service management system, identifying the user from a login identity carried in a request transferred for delivery to the service management system over a communication network by the client device.

4. The method of claim 3 wherein identifying the first social network service associated with the user comprises, in the service management system, identifying any of a plurality of services associated with the login identity.

5. The method of claim 4 wherein enabling the service feature comprises transferring from the service management system, for delivery over the communication network to the client device, a response that identifies the first social network service and service information with which the client device initiates the communication.

6. The method of claim 1 further comprising presenting to the user, via a graphical user interface, a catalog of services from which to graphically select a subset of the services to associate with the user, wherein the first social network service is included in the catalog of services.

7. The method of claim 1 wherein the first social network service comprises a social network website, the productivity feature comprises a send command, and the service feature directs the send command to send the content generated by the productivity application to the social network website.

8. A method of operating a service management system, the method comprising:

receiving a service request transferred for delivery to the service management system by a client device that identifies a login identity associated with a productivity application running on the client device and used by a user to generate content;

processing the service request to determine, based on the login identity, at least which social network services of a plurality of services to enable within the productivity application and which other social network services of the plurality of services to disable within the productivity application; and, to enable the social network services, transferring a response for delivery to the client device that includes service information with which service features corresponding to the social network services within productivity features of the productivity application communicate with the social network services to allow the user to perform features on the content related to the social network services.

9. The method of claim 8 wherein the service features comprise sub-features of the productivity features within the productivity application that, when invoked through a graphical user interface on the client device, direct the client device to initiate communications with the social network services.

10. The method of claim 8 further comprising transferring for presentation to a user via a graphical user interface a catalog of the plurality of services from which to graphically select a subset of the plurality of services to associate with the login identity.

11. The method of claim 10 wherein the social network services comprise the subset of the plurality of services selected in the catalog of the plurality of services.

12. The method of claim 8 wherein the services comprise websites, at least one of the productivity features comprises a send command, and at least one of the service features directs the send command to send the content produced by the productivity application to at least one of the websites.

13. The method of claim 8 wherein the service feature within the productivity features of the productivity application allows a user to source images from at least one of the social network services for insertion into the productivity application.

14. An apparatus comprising:
a processing system;
a non-transitory storage device having program instructions stored thereon that, when executed by the processing system, direct the processing system to:

identify a user associated with a productivity application with which the user interacts with content;
identify a social network service associated with the user;
enable a service feature within a productivity feature in a feature menu of the productivity application, wherein the service feature corresponds to the social network service and allows the user to perform a function with the content related to the social network service; and,
disable another service feature within the productivity feature in the feature menu, wherein the other service feature corresponds to another social network service.

15. The apparatus of claim 14 wherein the service feature comprises a sub-feature of the productivity feature that, when invoked through a graphical user interface on a client device running the productivity application, directs the client device to initiate a communication with the social network service.

16. The apparatus of claim 15 wherein, to identify the user associated with the productivity application, the program instructions when executed by the processing system direct the processing system to identify the user from a login identity.

17. The apparatus of claim 16 wherein, to identify the social network service associated with the user, the program instructions when executed by the processing system direct the processing system to identify any of a plurality of services associated with the login identity.

18. The apparatus of claim 17 wherein, to enable the service feature, the program instructions when executed by the processing system direct the processing system to identify the social network service and service information to a client device through which the productivity application initiates a communication with the social network service.

19. The apparatus of claim 14 wherein the program instructions, when executed by the processing system, further direct the processing system to present to the user, via a graphical user interface, a catalog of services from which to graphically select a subset of the services to associate with the user, wherein the social network service is included in the catalog of service.

20. The apparatus of claim 14 wherein the social network service comprises a website, the productivity feature comprises a share command, and the service feature directs the share command to share content produced by the productivity application with the website.

* * * * *